Patented Mar. 29, 1949

2,465,892

UNITED STATES PATENT OFFICE 2,465,892

MANUFACTURE OF ACYLOXY-CARBOXYLIC ACIDS AND SALTS THEREOF

Ritchie Hart Lock, Chigwell, and Leonard Harold Adcock, Ilford, England, assignors to Howards & Sons Limited, Ilford, England No Drawing. Application April 19, 1946, Serial No. 663,634. In Great Britain April 24, 1945

10 Claims. (Cl. 260—476)

In the manufacture of acyloxy-aliphatic carboxylic acids, for example, α-acyloxy-propionic acids, by the acylation of the corresponding monohydroxy-carboxylic acids either poor yields are obtained owing to the tendency of such acids to form anhydro-condensation products, for example, lactones or lactides, by condensation between the hydroxyl and carboxylic acid groups, or relatively costly acylating agents are used, such as acetic anhydride or acetyl chloride which also necessitate the removal and disposal of by-product acetic acid or hydrogen chloride.

According to the present invention, a process for the manufacture of acyloxy-aliphatic carboxylic acids or salts thereof, comprises causing an alkali metal salt of a lower α-monohydroxy-fatty acid, to react with an aliphatic or aromatic carboxylic acid containing not more than 7 carbon atoms and of lower strength than the acid of the said salt in the presence of an organic liquid which is capable of carrying over water vapor when distilled in the presence of water and which is so distilled during the reaction to entrain water formed by the acylation.

By the expression "an aliphatic or aromatic carboxylic acid of lower strength than the acid of the said salt" there is to be understood an acid which will not react to any considerable extent with the hydroxy-carboxylic salt to liberate the free hydroxy-carboxylic acid.

As lower α-monohydroxy-fatty acids, that is to say, α-monohydroxy-monocarboxylic acids of the lower fatty acid series, of which the salts are to be acylated in accordance with the invention, there may be mentioned for example, glycollic acid or lactic acid. Among the salts of these acids there may be mentioned, for example, the sodium, potassium and lithium.

As the aliphatic or aromatic carboxylic acids to be used for the acylation there may be mentioned, for example, fatty acids such as acetic acid, propionic acid or caproic acid; and also benzoic acid.

The process of the invention is especially suitable for the manufacture of α-acetoxy-propionic acid or salts thereof by the use of acetic acid to acetylate a salt of lactic acid.

The water-entraining liquid may be any liquid which is capable of carrying over water vapour when distilled in the presence of water. There is advantageously used a water-entraining liquid, for example, xylene, benzene, carbon disulphide or carbon tetrachloride, which is immiscible with water so that it can be easily separated from the water after condensation of the mixed vapours. The use of a liquid immiscible with water is also of advantage in that it enables the condensed liquid to be returned to the system after being freed from water. For this purpose mixed vapours of the water-entraining liquid and of water are condensed as they are evolved from the reaction mixture, and the water-entraining liquid which separates from the water upon condensation is returned to the reaction mixture. In the case of an acylating acid, for example, acetic acid, which can be distilled under the conditions of reaction, a quantity of this acid in excess of that required for the acylation may be used as the water-entraining liquid.

The salts of α-acyloxy-aliphatic carboxylic acids obtained by the acylation may be converted into the free α-acyloxy-carboxylic acids by treatment with a strong acid, for example, sulphuric acid, provided that care is taken to avoid hydrolysis of the acyloxy-group by the action of water at a temperature above room temperature. Thus, the treatment with acid and any subsequent treatment for isolating the free α-acyloxy-carboxylic acid should either be conducted under anhydrous conditions or, if water is present, at a temperature not exceeding room temperature. Accordingly, when water is present during the treatment with acid and distillation at a raised temperature is used to isolate the free α-acyloxy-carboxylic acid, the water should be removed before the distillation is carried out.

The following examples illustrate the invention, the parts being by weight unless otherwise stated, and the relationship of parts by weight to parts by volume being the same as that of the kilogram to the litre:

Example 1

A mixture of 30.6 parts of sodium lactate, 80 parts by volume of glacial acetic acid and 80 parts by volume of xylene are heated at the boil under atmospheric pressure in a vessel fitted with a condenser having a device, for example, a Dean and Stark moisture determination apparatus, to enable the aqueous layer of the condensate to be removed and the xylene layer to be returned to the reaction vessel. The heating is continued until no more water can be collected. The mixture remaining in the reaction vessel is then distilled under a pressure of about 100 millimetres in order to remove the xylene and unchanged acetic acid. The residue contains 41.5 parts of sodium α-acetoxy-propionate which represents a yield of 98.5 per cent. The product can be purified by crystallisation from acetic acid.

The free α-acetoxy-propionic acid may be obtained as follows: A mixture of 13.7 parts of concentrated sulphuric acid of 98 per cent strength and 20 parts by volume of glacial acetic acid is added very slowly to the above residue containing 41.5 parts of sodium α-acetoxy-propionate, and care is taken to maintain the mixture at about 15° C. The resulting mixture is allowed to stand for 24 hours in order to enable the precipitated sodium sulphate to remove the water present. The mixture is then filtered to remove the sodium sulphate, and the filtrate is fractionally distilled under reduced pressure to recover 30.3 parts of α-acetoxy-propionic acid.

Example 2

A mixture of 20.7 parts of sodium lactate, 100 parts of benzoic acid and 100 parts by volume of xylene are heated at the boil in the manner described in Example 1. The residue obtained after removing the xylene and unchanged benzoic acid by distillation under reduced pressure contains 34.5 parts of sodium α-benzoyloxy-propionate, which represents a yield of 85 per cent.

Example 3

A mixture of 21.9 parts of sodium lactate, 75 parts by volume of propionic acid and 75 parts by volume of xylene are heated at the boil in the manner described in Example 1. The residue obtained after removing the xylene and unchanged propionic acid by distillation under reduced pressure contains 31.8 parts of sodium α-propionoxy-propionate, which represents a practically theoretical yield.

Example 4

33.1 parts of sodium glycollate are made by neutralising 25.7 parts of glycollic acid with a solution of sodium hydroxide. The solution of sodium glycollate is evaporated until crystallisation sets in, and then 100 parts by volume of glacial acetic acid are added, the crystals passing into solution. 100 parts by volume of xylene are added, and the mixture is refluxed for 48 hours as described in Example 1. About 44 parts of sodium acetoxy-acetate are obtained representing a yield of about 93 per cent.

Example 5

12.7 parts of lactic acid of 90 per cent. strength are neutralised with sodium hydroxide solution, and the mixture is evaporated until nearly all the water is driven off. 70 parts by volume of caproic acid, and then 65 parts by volume of xylene, are added, and the mixture is refluxed for 72 hours as described in Example 1. About 24.8 parts of sodium α-caproxy-propionate are obtained, representing a yield of about 93 per cent.

Example 6

21.2 parts of lactic acid of 90 per cent. strength are neutralised with potassium hydroxide solution. The resulting solution is evaporated until nearly all the water is driven off. The deposited potassium lactate is brought into solution by the addition of 50 parts of volume of glacial acetic acid, and 50 parts by volume of xylene are added. The mixture is refluxed as described in Example 1 for 48 hours. About 28.9 parts of potassium α-acetoxy-propionate are obtained, representing a yield of about 80 per cent.

We claim:

1. In a process for the manufacture of α-acyloxy-aliphatic carboxylic acids and salts thereof, the steps which comprise causing an alkali metal salt of an α-monohydroxy-monocarboxylic acid of the lower fatty acid series to react with a carboxylic acid containing not more than 7 carbon atoms and of lower strength than the acid of the said salt in the presence of an organic liquid which is capable of carrying over water vapor when distilled in the presence of water and which is so distilled during the reaction to entrain water formed by the acylation.

2. In the process defined in claim 1, wherein the salt of the α-monohydroxy-monocarboxylic acid is an alkali metal lactate.

3. In the process defined in claim 1, wherein a fatty acid containing not more than 7 carbon atoms is used as the acylating acid.

4. In the process defined in claim 1, wherein benzoic acid is used as the acylating acid.

5. In the process defined in claim 1, wherein the organic water-entraining liquid is immiscible with water.

6. In a process for the manufacture of α-acetoxy-propionic acid and salts thereof, the steps which comprise causing an alkali metal lactate to react with acetic acid in the presence of an organic liquid which is capable of carrying over water vapor when distilled in the presence of water and which is so distilled during the reaction to entrain water formed by the acylation.

7. In a process for the manufacture of α-acyloxy-aliphatic carboxylic acids and salts thereof, the steps which comprise causing an alkali metal salt of an α-monohydroxy-monocarboxylic acid of the lower fatty acid series to react with a carboxylic acid containing not more than 7 carbon atoms and of lower strength than the acid of the said salt in the presence of a water-immiscible organic liquid which is capable of carrying over water vapor when distilled in the presence of water and which is so distilled during the reaction to entrain water formed by the acylation, condensing the mixed vapors of the water-entraining liquid and of water as they are evolved from the reaction mixture, and returning to the reaction mixture the water-entraining liquid which separates from the water upon condensation.

8. In a process for the manufacture of α-acetoxy-propionic acid and salts thereof, the steps which comprise causing an alkali metal lactate to react with acetic acid in the presence of a water-immiscible organic liquid which is capable of carrying over water vapor when distilled in the presence of water and which is so distilled during the reaction to entrain water formed by the acylation, condensing the mixed vapors of the water-entraining liquid and of water as they are evolved from the reaction mixture, and returning to the reaction mixture the water-entraining liquid which separates from the water upon condensation.

9. In a process for the manufacture of α-benzoyloxy-propionic acid and salts thereof, the steps which comprise causing an alkali metal lactate to react with benzoic acid in the presence of a water-immiscible organic liquid which is capable of carrying over water vapor when distilled in the presence of water and which is so distilled during the reaction to entrain water formed by the acylation, condensing the mixed vapors of the water-entraining liquid and of water as they are evolved from the reaction mixture, and returning to the reaction mixture the water-entraining liquid which separates from the water upon condensation.

10. In a process for the manufacture of acetoxy-acetic acid and salts thereof, the steps which comprise causing an alkali metal glycollate to react with acetic acid in the presence of a water-immiscible organic liquid which is capable of carrying over water vapor when distilled in the presence of water and which is so distilled during the reaction to entrain water formed by the acylation, condensing the mixed vapors of the water-entraining liquid and of water as they are evolved from the reaction mixture, and returning to the reaction mixture the water-entraining liquid which separates from the water upon condensation.

RITCHIE HART LOCK.
LEONARD HAROLD ADCOCK.

REFERENCES CITED

The following references are of record in the file of this patent:

UNITED STATES PATENTS

| Number | Name | Date |
| --- | --- | --- |
| 2,158,107 | Carruthers | May 16, 1939 |
| 2,265,946 | Loder | Dec. 9, 1941 |
| 2,399,595 | Fialchione et al. | Apr. 30, 1946 |

OTHER REFERENCES

Siegfried, "Berichte," vol. 22 (1889) pp. 2715–2716.